United States Patent
Titus et al.

[11] Patent Number: 6,133,648
[45] Date of Patent: Oct. 17, 2000

[54] APPARATUS FOR SELECTIVELY ENABLING OR DISABLING AN ACTUATABLE OCCUPANT PROTECTION DEVICE

[75] Inventors: Derrick G. Titus, Plymouth; Thomas Modzelewski, Brighton, both of Mich.

[73] Assignee: TRW Inc., Lyndhurst, Ohio

[21] Appl. No.: 09/139,891

[22] Filed: Aug. 25, 1998

[51] Int. Cl.$^7$ .................................................. B60R 21/32
[52] U.S. Cl. ..................... 307/10.2; 180/287; 200/43.08; 280/728.1
[58] Field of Search .................................. 307/10.2, 10.1, 307/9.1; 180/287; 200/43.08; 280/728.1

[56] References Cited

U.S. PATENT DOCUMENTS

| | | |
|---|---|---|
| 5,544,914 | 8/1996 | Borninski et al. . |
| 5,548,163 | 8/1996 | French ..................................... 307/10.2 |
| 5,641,952 | 6/1997 | Collings ................. 200/43.08 |
| 5,816,611 | 10/1998 | Parn ........................................ 280/735 |
| 5,866,954 | 2/1999 | Daniel et al. ......................... 280/728.1 |
| 5,992,880 | 11/1999 | Cuddihy et al. ...................... 280/728.1 |

*Primary Examiner*—Albert W. Paladini
*Attorney, Agent, or Firm*—Tarolli, Sundheim, Covell, Tummino & Szabo L.L.P.

[57] ABSTRACT

The present invention provides an apparatus (10) for selectively enabling or disabling an actuatable vehicle occupant protection device (18). The apparatus (10) includes a cylindrical housing (80) having an inner sidewall portion (88), which has an annular ledge (90) adjacent the first end (82). A locking rib (102) extends axially a predetermined distance from the ledge (90) toward the second end (84) of the housing (80). The inner sidewall portion (88) has a pair of spaced apart locking channels (104 and 106) along opposed sides of the locking rib (102). An elongated shaft member (40) is disposed within and rotatable relative to the housing (80). The shaft member (40) has at least one slot (50) extending axially from a first end (42) portion of the shaft member (40). A blade member (56) is disposed within and axially movable relative to the shaft member (40). The blade member (56) has at least one arm (60) extending radially through the slot (50) and into one of the locking channels (104 or 106). The arm (60) is moveable between locking positions through rotation of the shaft member (40) with an appropriate key (32). Selective movement of the arm (60) from one locking position to another results in enabling or disabling the protection device (18).

34 Claims, 4 Drawing Sheets

6,133,648

APPARATUS FOR SELECTIVELY ENABLING OR DISABLING AN ACTUATABLE OCCUPANT PROTECTION DEVICE

TECHNICAL FIELD

The present invention relates to an apparatus for selectively enabling or disabling an actuatable vehicle occupant protection device.

BACKGROUND OF THE INVENTION

There are several instances in which it is desirable to disable an occupant protection device of a vehicle, such as an air bag. It may be desirable to disable an air bag, for example, when a vehicle occupant is improperly positioned in the vehicle or when a rear facing child seat is positioned adjacent the air bag. One approach utilizes a vehicle key to actuate an air bag control switch. The control switch causes the air bag to be enabled or disabled depending upon the actuation condition of the control switch.

SUMMARY OF THE INVENTION

The present invention provides an apparatus for selectively enabling or disabling an actuatable vehicle occupant protection device. The apparatus includes a cylindrical housing mountable to a vehicle. The housing has first and second ends and a longitudinal axis extending through the first and second ends. The housing also has an inner sidewall portion, which has an annular ledge adjacent the first end. A locking rib extends axially a predetermined distance from the ledge toward the second end of the housing. The inner sidewall portion has a pair of spaced apart locking channels along opposed sides of the locking rib. An elongated shaft member has first and second end portions. The shaft member is disposed within and rotatable relative to the housing. The first end portion of the shaft member is positioned adjacent the first end of the housing and engages the ledge. The shaft member has at least one slot extending axially from the first end portion of the shaft member and terminating at a location intermediate the first and second end portions of the shaft member. A blade member is disposed within and axially movable relative to the shaft member. The blade member has at least one arm extending radially through the slot of the shaft member and into one of the locking channels. The arm is movable between the locking channels through rotation of the shaft member. A biasing element urges the blade member toward the first end of the shaft member, thereby biasing one of the arms toward the ledge and into one of the locking channels.

Preferably, the apparatus also includes a switch element having at least two states operatively associated with the respective locking channels. The switch element changes the states in response to the arm moving between the locking channels. The switch element provides a signal indicative of the state of the switch for disabling or enabling the actuatable occupant protection device.

BRIEF DESCRIPTION OF THE DRAWINGS

The foregoing and other features of the invention will become more apparent to one skilled in the art upon consideration of the following description of the invention and the accompanying drawings in which.

DESCRIPTION OF A PREFERRED EMBODIMENT

Figure 1:
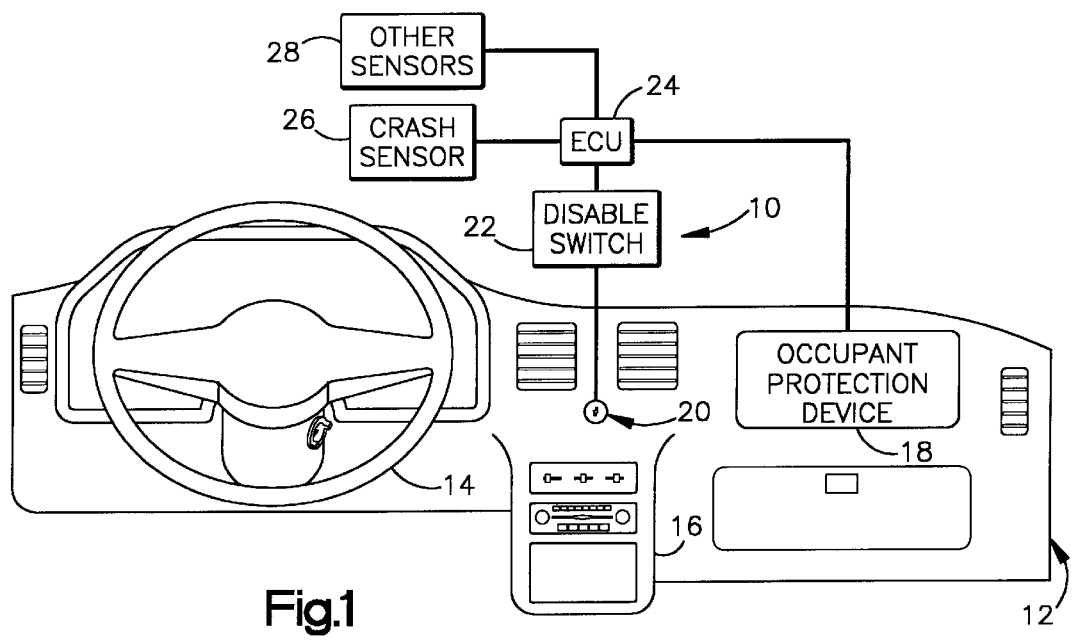
FIG. 1 is a front elevation of a vehicle instrument panel including an apparatus in accordance with the present invention.

FIG. 1 illustrates a vehicle occupant protection apparatus 10 installed on a vehicle instrument panel 12 in accordance with a preferred embodiment of the present invention. The instrument panel 12 includes a steering wheel 14 and a center console 16, which typically includes climate controls, vehicle entertainment controls and/or other controls for the convenience and comfort of vehicle occupants.

FIG. 1 also illustrates the instrument panel 12 as including a supplemental actuatable vehicle occupant protection device 18. The protection device 18 may include an inflatable air bag for, when actuated, helping to protect a vehicle occupant, such as a front passenger or driver, during a crash event. Other inflatable vehicle occupant protection devices that can be used in accordance with the present invention include, for example, inflatable seat belts, inflatable knee bolsters, inflatable head liners or side curtains, and knee bolsters operated by inflatable air bags.

The apparatus 10 further includes a key actuator mechanism 20 mounted in the instrument panel 12. While the preferred embodiment illustrates the actuator mechanism 20 mounted to the vehicle instrument panel 12, it will be understood and appreciated that the mechanism 20 may be mounted at other locations in the vehicle. The key actuator mechanism 20 is operatively connected to a control switch 22, which has at least two states. Actuating the key actuator mechanism 20 results in changing the state of the switch 22. The switch may be a mechanical device, an electrical device, a magnetic device, a photoelectric device or any structure capable of providing an appropriate control signal in response to actuation of the mechanism 20. The switch 22 is electrically connected to an electronic control unit (ECU) 24. The switch 22 provides a signal to the ECU 24 indicating whether to enable or disable the vehicle occupant protection device 18.

The ECU 24 preferably is a microcomputer. The ECU 24 also may include a plurality of discrete circuits, circuit components, an application specific integrated circuit (ASIC) or a combination of discrete circuits, circuit components and/or ASICs configured to accomplish the desired functions. Preferably, the ECU 24 is the central controller for the vehicle occupant protection device 18 as well as for other vehicle occupant protection devices of the vehicle.

The ECU 24 is electrically coupled to a crash sensor 26, which provides signals indicative of a crash event to the ECU 24. Preferably, the crash sensor 26 is an acceleration sensing device, such as an accelerometer. The crash sensor 26 might also be an impact sensing device, an inertia switch of known configuration or any other device capable of detecting a crash event.

The ECU 24 also receives signals from other sensors 28, which provide additional information for controlling actuation of the various occupant protection devices, including the device 18. Such other sensors 28 may include, for example, an occupant weight sensor for sensing the weight of one or more vehicle occupants, an occupant position sensor for sensing the position of one or more vehicle occupants, a vehicle speed sensor for sensing the speed of the vehicle, etc. In response to the signals from the crash sensor 26 and the other sensors 28, the ECU 24 controls actuation of protection device 18.

Figure 2:
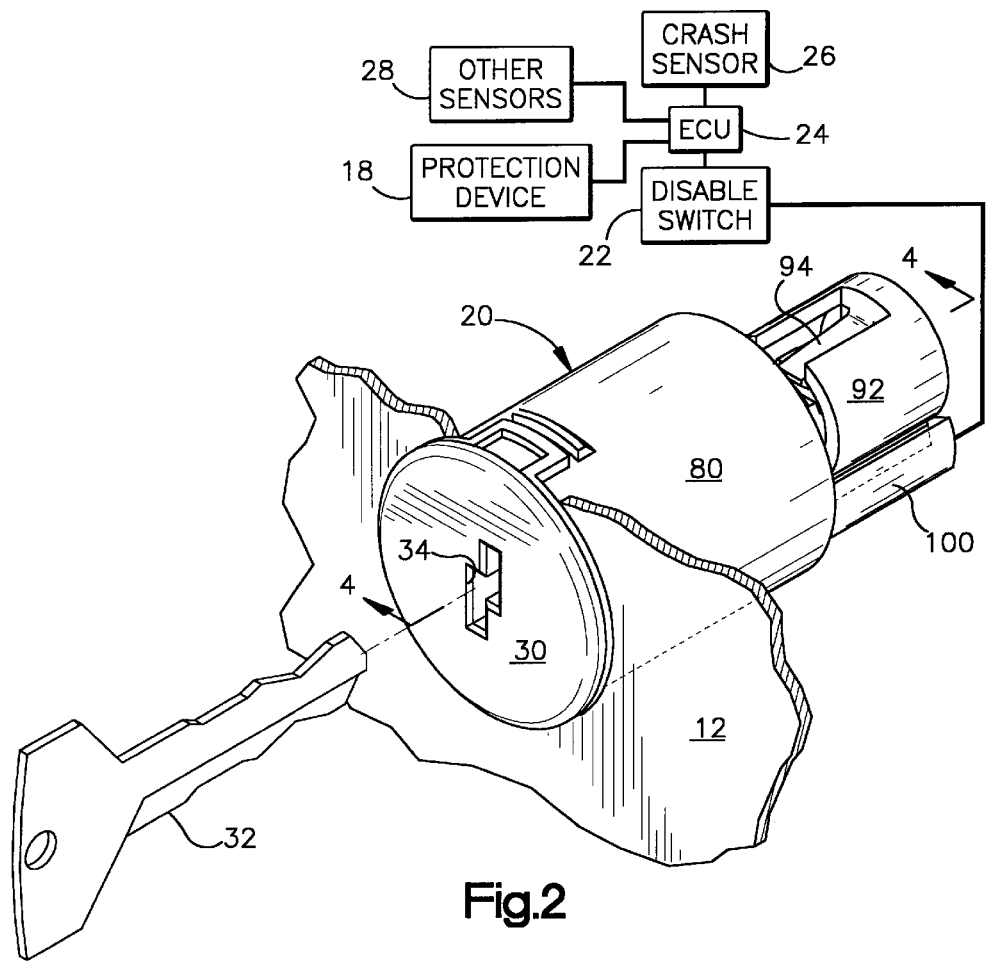
FIG. 2 is a perspective view of the apparatus shown in FIG. 1.

FIG. 2 illustrates a preferred embodiment of the key actuator mechanism 20. The key actuator mechanism 20 includes a key plate 30 dimensioned and configured for receiving a preselected vehicle key 32. For example, the key 32 may be an ignition key of the vehicle in which the mechanism 20 is installed. The vehicle key 32 is insertable into a key plate opening 34 of the actuator mechanism 20, which opening extends through at least a substantial portion of the key plate 30. The key 32 is inserted into and rotated within the key plate opening 34 to move the actuator mechanism 20 between first and second locking positions. Each locking position corresponds to a state of the switch 22. Accordingly, a vehicle operator controls the switch 22 with the vehicle key 32, and the switch 22, in turn, enables or disables the protection device 18.

Figure 3:
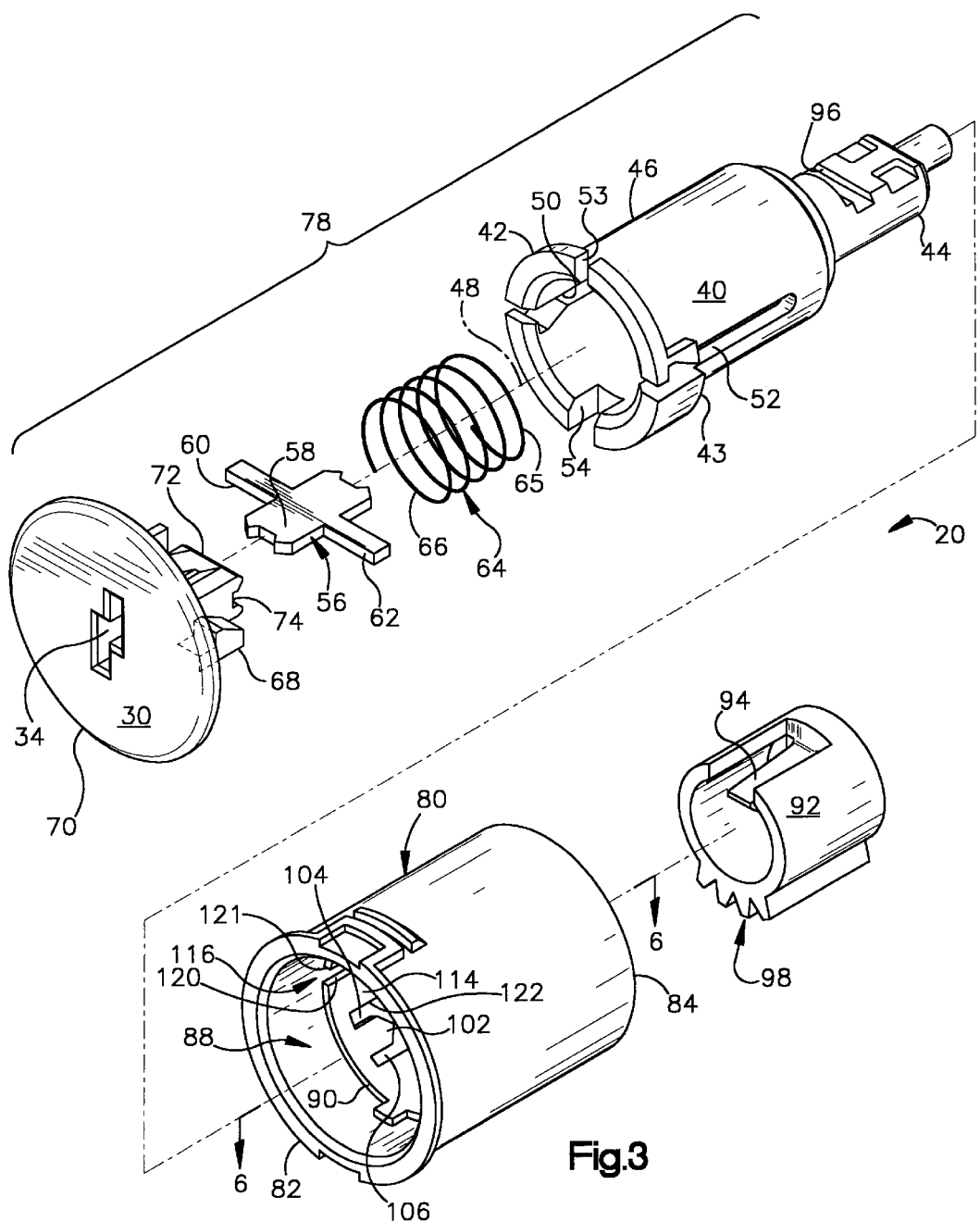
FIG. 3 is an exploded perspective view of part of the apparatus of FIG. 2.
Figure 4:
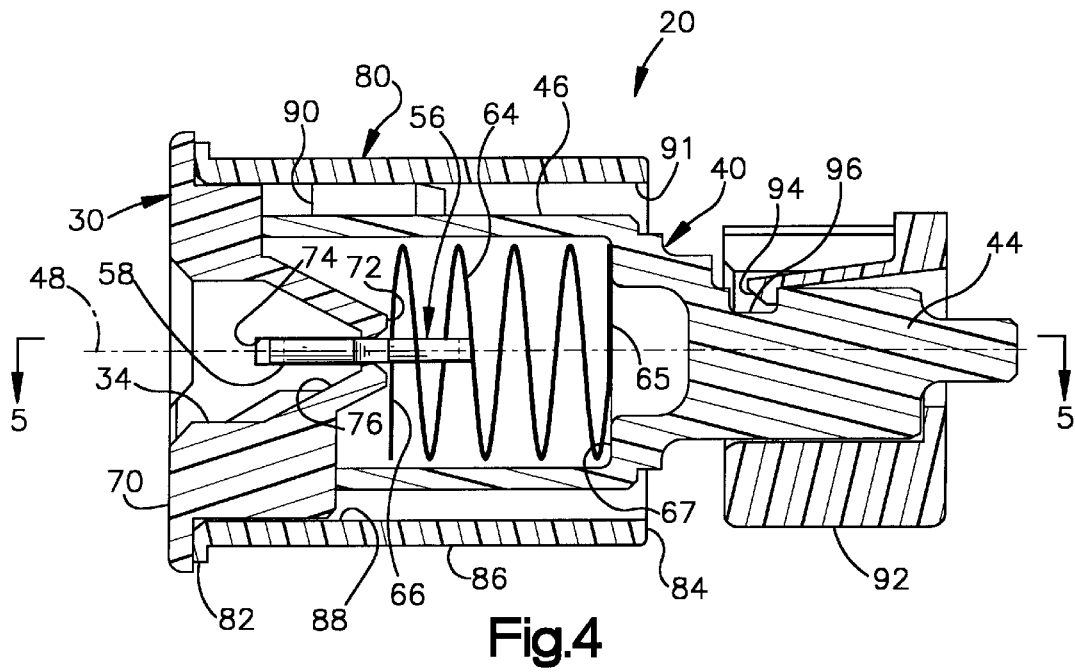
FIG. 4 is a sectional view of part of the apparatus of FIG. 2 taken along line 4—4 of FIG. 2.
Figure 5:
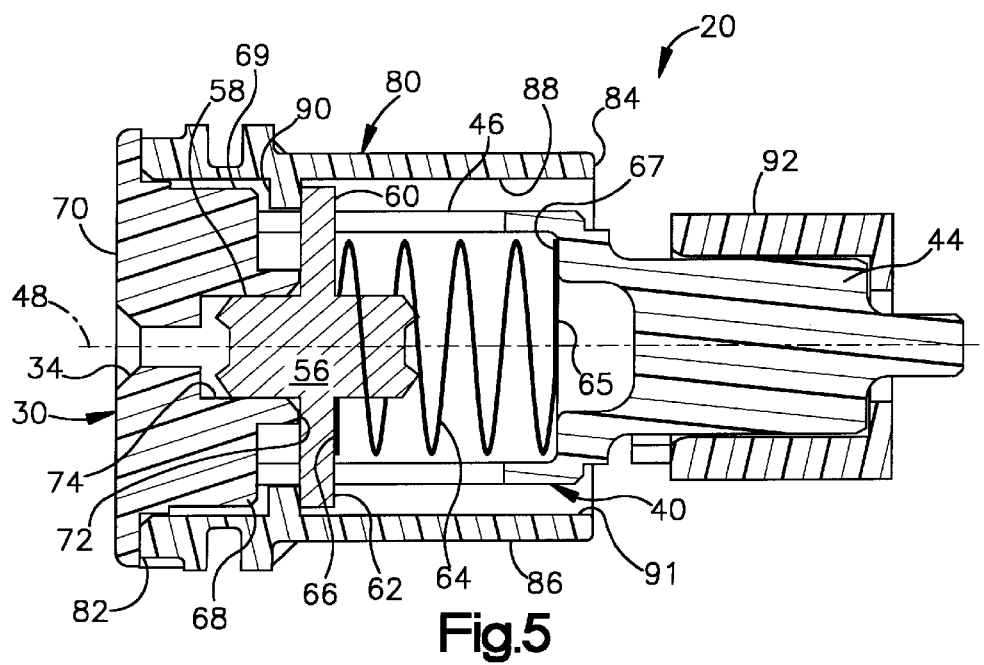
FIG. 5 is a sectional view of the apparatus of FIG. 4 taken along line 5—5 of FIG. 4.

Referring to FIGS. 3–5, the key actuator mechanism 20 includes an elongated shaft member 40 having first and second end portions 42 and 44, respectively. The shaft member 40 is formed of a generally rigid and resilient material, preferably a suitable plastic material. The shaft member 40 has a cylindrical sidewall portion 46 extending between the end portions 42 and 44. The sidewall portion 46 suitably has a substantially constant outer diameter up to an outwardly extending circumferential lip 43 at the first end portion 42. The shaft member 40 has a central longitudinal axis 48 extending through the first and second end portions 42 and 44, respectively. At least one and preferably a pair of diametrically, elongated opposed slots 50 and 52 are formed in the sidewall portion 46. The slots 50 and 52 extend axially from the first end portion 42 and terminate at a location intermediate the first and second end portions 42 and 44, respectively. The first end portion 42 also preferably includes a pair of diametrically opposed notches 53 and 54 configured for receiving mating portions of the key plate 30.

A blade member 56 is disposed within and axially movable relative to the shaft member 40. The blade member 56 is formed of a rigid material, such as, for example, brass, steel or a suitable synthetic resin material. Other rigid materials also may be used. The blade member 56 includes an axially extending base portion 58. At least one arm 60 extends radially from the base portion 58. Preferably, a pair of coplanar arms 60 and 62 extend radially from the base portion 58. The arms 60 and 62 extend a predetermined distance from the base portion, such that they extend through respective slots 50 and 52.

A resilient biasing element 64, suitably a metal spring, is interposed between the blade member 56 and a distal interior portion of the shaft member 40. A ledge 67 may be formed at the juncture of the cylindrical sidewall portion 46 and the second end portion 44 to support one end 65 of the biasing element 64. The other end 66 of the biasing element 64 engages the blade member 56, suitably at the arms 60 and 62. The biasing element 64 urges the blade member 56 toward the first end portion 42 of the shaft member 40 and into engagement with the key plate 30, as is shown in FIGS. 4 and 5.

The key plate 30 is attached at the first end portion 42 of the shaft member 40 by a pair of diametrically opposed retaining tabs 68 and 69. The retaining tabs 68 and 69 are removably attached within the slots 50 and 52, respectively. The key plate opening 34 extends axially between first and second ends 70 and 72 of the key plate 30. The second end 72 includes a blade receiving slot 74 in which an adjacent part of the blade body portion 58 is releasably received. The blade receiving slot 74 permits part of the blade member 56 to be positioned within the key plate opening 34 adjacent the first end 70. The key plate 30 further includes a key retaining feature 76, disposed adjacent the second end of the key plate opening 34, as is shown in FIG. 4. The key retaining feature 76 suitably is formed of converging portions of the key plate opening 34. The key retaining feature 76 limits the amount of axial insertion of the vehicle key 32 within the key plate opening 34. The key plate 30 is formed of a suitable rigid material, such as, for example, a rigid plastic material.

The key plate 30 and shaft member 40 enclose the biasing element 64 and the blade member 56. The key plate 30, the blade member 56, the biasing element 64 and the shaft member 40 define a subassembly, indicated at 78 in FIG. 3. The components of the subassembly 78 rotate together about the axis 48.

The key actuator mechanism 20 also includes a cylindrical housing 80 mountable to the instrument panel 12 of a vehicle. The housing 80 is formed of a generally rigid material, suitably nylon, glass fiber reinforced plastic or other appropriate materials. The housing 80 has first and second ends 82 and 84 and a cylindrical sidewall portion 86 extending between the ends. The housing 80 has an inner sidewall portion 88 which has an annular ledge 90 located adjacent the first end 82.

The cylindrical sidewall portion 46 of the shaft member 40 is positioned within and rotatable relative to the housing 80. The housing sidewall portion 86 is substantially coaxial with the axis 48. The length of the cylindrical sidewall portion 46 approximates the axial length of the housing 80. The lip 43 of the shaft first end portion 42 is positioned adjacent the first end of the housing and slidably engages the ledge 90. The second end portion 44 of the shaft member 40 extends through an opening 91 at the second end 84 of the housing 80.

After insertion of the shaft second end portion 44 beyond the second end 84 of the housing 80, an actuating gear 92 is removably attached to the second end portion 44. The actuating gear 92 suitably includes a detent 94, which may be received in a slot 96 formed on the second end portion 44. The actuating gear 92 also includes a plurality of teeth 98, which suitably engage corresponding teeth (not shown) of a gear 100 mounted within the vehicle instrument panel 12, as shown in FIG. 2. The gear 100 is operatively connected to the switch 22. The actuating gear 92 rotates according to the axial rotation of the subassembly 78, thereby driving the gear 100. The switch 22 thus is moved between its operative states by rotation of the subassembly 78, such as by the key 32.

Figure 6:
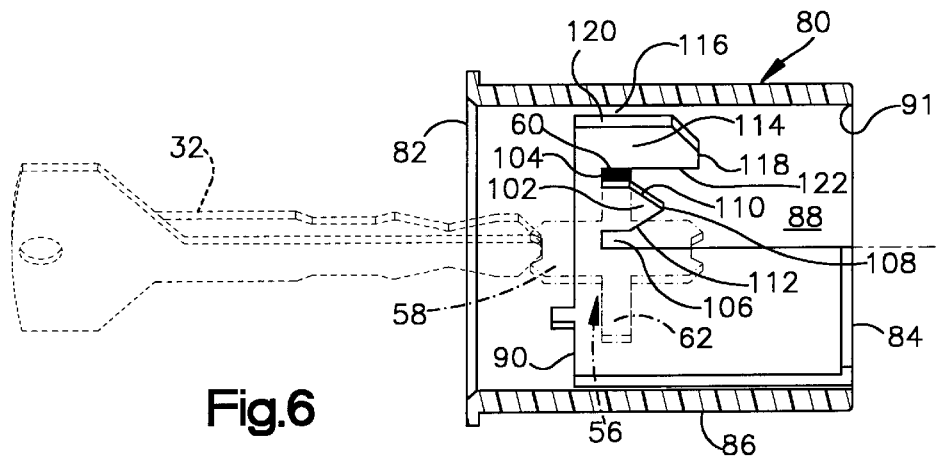
FIG. 6 is a sectional view of part of the apparatus of FIG. 3 taken along line 6—6 of FIG. 3, illustrating a first condition.
Figure 7:
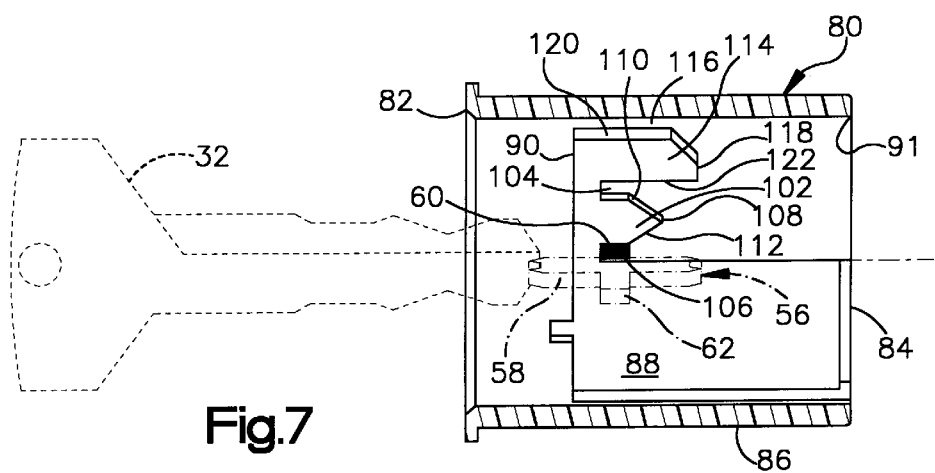
FIG. 7 is a sectional view of the apparatus of FIG. 6, illustrating a second condition.
Figure 8:
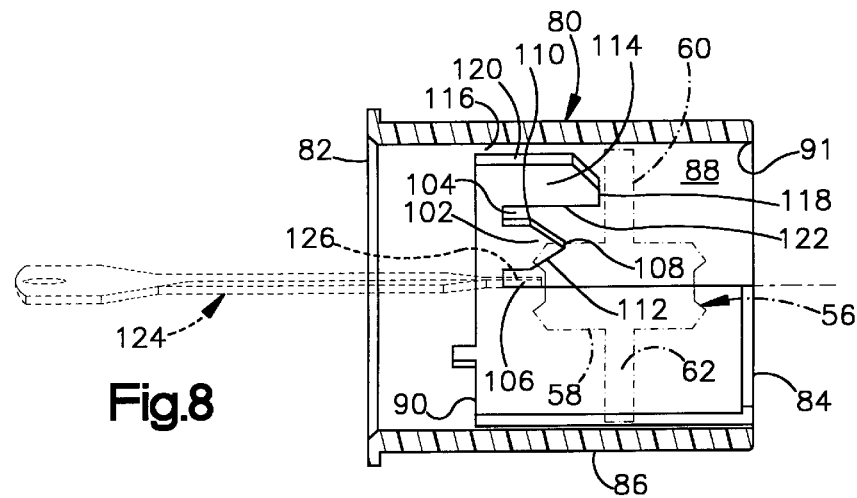
FIG. 8 is a sectional view of the apparatus of FIG. 6, illustrating yet another condition.

Referring to FIGS. 6–8, the inner sidewall portion 88 of the housing 80 includes at least one radially protruding locking rib 102. Preferably, there are two substantially identical locking ribs formed on diametrically opposed portions of the inner sidewall 88. For simplicity of illustration, only one locking rib 102 will be described. The locking rib 102 extends a predetermined distance axially from the ledge 90 toward the second end 82 of the housing 80. Preferably, the locking rib 102 extends from the ledge 90 a distance less than the axial length of the key plate opening 34. The locking rib 102 has a distal end 108 spaced from the ledge 90, with side edges 110 and 112 extending from the ledge 90 to the distal end 108. The side edges 110 and 112 taper substantially to a point at the distal end 108. A pair of spaced apart and axially extending locking channels 104 and 106 are formed in the sidewall 88 along opposed sides of the locking rib 102.

The width of each locking channel 104 and 106 is at least equal to the thickness of a respective arm 60 or 62 of the blade member 56. The arm 60 extends into a locking channel 104 or 106, as illustrated in FIGS. 6 and 7, respectively. It is desirable that the vehicle key 32, upon insertion into the key plate opening 34, engages the body portion 58 of the blade member 56 to move the arms 60 and 62 axially beyond the distal end 108 of the locking rib 102. Therefore, by inserting the vehicle key 32 a predetermined distance into the key plate opening 34 and rotating the key 32, the arm 60 may move between a first locking position at the locking channel 104, (FIG. 6) and a second locking position at the locking channel 106 (FIG. 7). Upon removal of the key 32, the biasing element 66 moves the blade member 56 toward the ledge 90. Preferably, the biasing element 64 is sufficiently strong to eject the key 32 from the actuator mechanism 20 if left in by a user. The tapered distal end 108 of the locking rib 102 guides the arm 60 into one of the channels 104 and 106, where it remains locked until repositioned by an appropriate key. When the arm 60 is positioned in a locking channel 104 or 106, rotation of the subassembly 78, and its component parts, is restricted by the arm 60 engaging the corresponding walls of the respective locking channel 104 or 106. Such rotation is restricted until the arms 60 and 62 are moved axially beyond the distal end 108 of the locking rib 102, suitably by insertion of the key 32 a predetermined distance into the opening 34.

The inner sidewall portion 88 of the housing 80 also includes a radially protruding assembly rib 114. An assembly channel 116 is formed through the ledge 90 and extends adjacent to the assembly rib 114. The assembly rib 114 has a distal end portion 118 and side edges 120 and 122, which extend from the ledge 90 to the distal end portion 118. The assembly rib 114 extends axially from the ledge 90 a distance greater than the axial length of the locking rib 102. The distal end portion 118 is chamfered from the side edge 120 toward the locking channels 104 and 106 to facilitate movement of the arm 60 from the assembly channel 116 into one of the locking channels 104 or 106. The side edge 122 of the assembly rib 114 and the side edge 110 of the locking rib 102, define walls of the locking channel 104. The other side edge 120 of the assembly rib 114 defines one wall portion of the assembly channel 116. The other wall portion 121 of the assembly channel 116 is formed of a radially protruding and axially extending portion of the inner sidewall 88. The wall portion 121 extends axially from the ledge 90 a distance at least equal to, although preferably greater than, the axial length of the assembly rib 114. The wall portion 121 is spaced apart from the side edge 120 sufficient to permit the arm 60 to traverse axially through the ledge 90 and beyond the assembly rib 114, as shown in FIG. 8. The arm 60 typically is positioned within the assembly channel 116 during only assembly or disassembly of the actuator mechanism 20.

The assembly rib 114 preferably extends from the ledge a distance greater than the depth which the key 32 may be inserted within the key plate opening 34. As stated above, the key retaining feature 76 engages the key 32 to limit the amount of axial insertion of the key 32 within the key plate opening 34. Thus, the typical vehicle key 32 cannot, through its insertion into the opening 34, cause axial movement of the arms 60 and 62 beyond the assembly rib 114.

Figure 9:
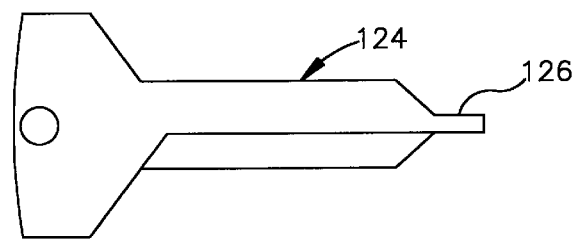
FIG. 9 is a front elevation of a key in accordance with a preferred embodiment of the present invention.

In order to move the blade member 56, such that the arms 60 and 62 move axially beyond the distal end 118 of the assembly rib 114, a specially configured assembly key 124 is required. As shown in the preferred embodiments of FIGS. 8 and 9, the assembly key 124 includes a narrow elongated finger 126 extending axially from a distal end of the assembly key 124. The elongated finger 126, is insertable through a portion of the key plate opening 34 formed through the key retaining feature 76. The finger 126 engages the blade member 56 to provide for additional axial movement of the blade arm 60 beyond the distal end 118 assembly rib 114. Because the typical vehicle key 32 does not include such finger 126, it cannot provide for the additional axial movement of the blade member arms 60 and 62 beyond the assembly rib 114. Accordingly, the vehicle key 32 only permits movement of the blade arms 60 and 62 between corresponding locking channels. A service technician, however, may be provided with such an assembly key 124 in order to perform repairs or modify components of the key actuator 20.

It will be understood and appreciated that the sectional views of FIGS. 6–8 illustrate a portion of the sidewall of the housing 80, and that the remaining portion of the inner sidewall 88 preferably is substantially identical in configuration. Accordingly, each arm 60 and 62 is associated with a locking rib and an assembly rib. In addition, each of the arms 60 and 62 is movable between associated locking channels of the respective locking ribs. Each of the arms 60 and 62 also may traverse within respective assembly channels during assembly and disassembly of the actuator mechanism 20.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for selectively enabling or disabling an actuatable vehicle occupant protection device, said apparatus comprising:

a cylindrical housing mountable to a vehicle, said housing having first and second ends and a longitudinal axis extending through said first and second ends of said housing, said housing having an inner sidewall portion, said inner sidewall portion having an annular ledge adjacent said first end with a locking rib extending a predetermined distance axially from said ledge toward said second end of said housing, said inner sidewall portion having a pair of spaced apart locking channels along opposed sides of said locking rib;

an elongated shaft member having first and second end portions, said shaft member disposed within and rotatable relative to said housing, said first end portion of said shaft member positioned adjacent said first end of said housing and engaging said ledge, said shaft member having at least one slot extending axially from said first end portion of said shaft member and terminating at a location intermediate said first and second end portions of said shaft member;

a blade member disposed within and axially moveable relative to said shaft member and to said housing, said blade member having at least one arm extending radially through said at least one slot of said shaft member, said at least one arm extending into one of said locking channels and being movable between said locking channels through rotation of said shaft member;

a biasing element urging said blade member toward said first end of said shaft member, thereby biasing said at least one arm toward said ledge and into one of said locking channels; and a switch element having two states operatively associated with said locking channels, said switch element changing states in response to said at least one arm moving between said locking channels, said switch element providing a signal indicative of the state of said switch element for disabling or enabling the actuatable protection device.

2. The apparatus of claim 1 further comprising a key plate attached to said first end of said shaft member, said key plate having first and second ends and an axially extending opening, said key plate opening providing a passage to said blade member.

3. The apparatus of claim 2 wherein said locking rib extends from said ledge a distance less than the axial length of said key plate opening.

4. The apparatus of claim 2 wherein said key plate opening is dimensioned and configured for receiving a length of a preselected vehicle key.

5. The apparatus of claim 2 wherein said key plate comprises a blade receiving member positioned adjacent said second end of said key plate.

6. The apparatus of claim 2 wherein said key plate further comprises at least one retaining tab removably attached within said at least one slot of said shaft member.

7. The apparatus of claim 1 further comprising an actuating member attached to said second end portion of said shaft member, said actuating member operatively connected to said switch element.

8. The apparatus of claim 1 wherein said biasing element comprises a spring interposed between said blade member and a portion of said shaft member.

9. The apparatus of claim 1 wherein said locking rib has a distal end portion spaced from said ledge and side edges extending from said ledge to said distal end portion of said locking rib, said side edges tapering substantially to a point at said distal end portion of said locking rib.

10. The apparatus of claim 1 wherein said at least one arm of blade member has a predetermined thickness and said at least one slot has a width equal to or greater than said thickness of said at least one arm of said blade member.

11. The apparatus of claim 1 wherein said first end portion of said shaft member comprises a cylindrical sidewall portion having a length which approximates the axial length of said housing.

12. The apparatus of claim 1 further comprising a controller electrically coupled to said switch element for controlling operation of the occupant protection device in response to said switch element signal.

13. The apparatus of claim 1 wherein said second end portion of said shaft member extends beyond said second end of said housing.

14. The apparatus of claim 13 further comprising an actuating member releasably connected to said second end portion of said shaft member and operatively coupled to said switch element.

15. The apparatus of claim 2 further comprising a key retaining feature disposed at said second end of said key plate opening for limiting the amount of axial insertion of the vehicle key within said key plate opening.

16. The apparatus of claim 15 further comprising:

an axially extending aperture formed in said key retaining feature; and an assembly key insertable into said key plate opening, such that a portion of said assembly key extends through said aperture and beyond said key retaining feature.

17. The apparatus of claim 16 further wherein said inner sidewall portion of said housing further comprises an assembly rib extending axially from said ledge adjacent said locking rib and an assembly channel formed through said ledge extending adjacent said assembly rib.

18. The combination of claim 17 wherein said assembly key further comprises an elongated finger extending from a distal end of said assembly key, said finger insertable through said aperture of said key retaining feature to provide for axial movement of the said blade arms beyond said assembly rib of said housing, such that said at least one arm of said blade member may be rotated between said assembly channel and one of said locking channels.

19. The apparatus of claim 17 wherein said assembly rib extends axially from said ledge a distance greater than the axial length of said key plate opening.

20. The apparatus of claim 19 wherein said assembly rib has a distal end portion spaced from said ledge and side edges extending between said ledge and said distal end portion of said assembly rib, said assembly rib separated from said locking rib by one of said locking channels.

21. The apparatus of claim 20 wherein said distal end portion of said assembly rib is chamfered from a distal one of said side edges of said assembly rib toward said locking channels to facilitate movement of said at least one arm of said blade member from said assembly channel into one of said locking channels.

22. The apparatus of claim 20 wherein a first of said side edges of said assembly rib defines a wall of a proximal one of said locking channels.

23. The apparatus of claim 22 wherein a second of said side edges of said assembly rib defines a first wall portion of said assembly channel.

24. The apparatus of claim 23 wherein said inner sidewall portion of said housing further comprises a second wall portion of said assembly channel extending axially from said ledge a distance at least equal to the axial length of said assembly rib, said second wall portion being spaced apart from and substantially parallel said first wall portion of said assembly channel, said assembly channel being formed through said ledge sufficient to permit said at least one arm to traverse axially through said ledge toward said second end of said housing.

25. The apparatus of claim 1 further comprising an assembly rib disposed on said inner sidewall portion of said housing, said assembly rib extending axially from said ledge a greater distance than said locking rib, one of said locking channels being positioned between said locking rib and said assembly rib.

26. The apparatus of claim 25 wherein said assembly rib has a distal end portion and two side edges extending between said ledge and said distal end portion of said assembly rib, said assembly rib separated from said locking rib by one of said locking channels.

27. The apparatus of claim 26 wherein said distal end portion of said assembly rib is chamfered from a second of said side edges of said assembly rib toward said locking channels to facilitate movement of said at least one arm from said assembly channel into one of said locking channels.

28. The apparatus of claim 26 wherein a first of said side edges of said assembly rib defines a wall of an adjacent one of said locking channels.

29. The apparatus of claim 28 wherein a second of said side edges of said assembly rib defines a radially protruding first wall portion of said assembly channel.

30. The apparatus of claim 29 wherein said inner sidewall portion of said housing further comprises a radially protruding second wall portion of said assembly channel extending axially from said ledge a distance at least equal to the axial length of said assembly rib, said second wall portion being spaced apart from and substantially parallel said first wall portion of said assembly channel, said assembly channel being formed through said ledge to permit said at least one arm to traverse axially through said ledge toward said second end of said housing.

31. An apparatus for selectively enabling or disabling an actuatable vehicle occupant protection device, said apparatus comprising:

a key plate having an opening dimensioned and configured for receiving a length of a vehicle key, an elongated shaft member having first and second ends and an axis extending through said first and second ends, said key plate attached at said first end of said shaft member, said shaft member having an elongated cylindrical sidewall portion with a pair of diametrically opposed slots extending axially along said cylindrical sidewall portion from said first end of said shaft member and terminating at a location intermediate said first and second ends of said shaft member;

a blade member having a body portion positioned coaxially within said shaft member and a pair of arms extending radially from said body portion through said slots for axial movement within said slots of said cylindrical sidewall portion of said shaft member, said key plate opening providing a passage to said body portion of said blade member;

biasing means for biasing said blade member toward said first end of said shaft member;

an elongated cylindrical housing mountable to a vehicle, said housing having first and second ends and a longitudinal axis extending through said first and second ends of said housing coaxial with said shaft member axis, said housing having an inner sidewall portion, said inner sidewall portion comprising locking guide means for guiding axial movement of at least one of said arms into one of a first and second locking position, said sidewall portion of said shaft member being positioned concentrically within and rotatable relative to said housing, said first end of said housing positioned adjacent said first end of said shaft member, said second end of said shaft member extending beyond said second end of said housing;

an actuating member attached to said second end of said shaft; and a switch element positioned adjacent and operatively connected to said actuating member, said switch element having at least two states operatively associated with said first and second locking positions, said switch element changing states upon movement of said at least one arm between said first and second locking positions and providing a signal indicative of the state of said switch element.

32. The apparatus of claim 31 wherein said locking means further comprises:

at least one locking rib disposed along the inner sidewall portion of housing, said locking rib extending a predetermined distance axially from said ledge toward said second end of said housing, and a pair of spaced apart locking channels formed in said inner sidewall portion of said housing along opposed sides of said at least one locking rib, said biasing means urging said at least one arm into one of said locking channels.

33. The apparatus of claim 32 wherein said locking rib further comprises a distal end portion spaced from said ledge and side edges extending from said ledge to said distal end portion of said locking rib, said side edges tapering to a point at said distal end portion of said locking rib.

34. The apparatus of claim 31 further comprising a controller electrically coupled to said switch element for controlling actuation of the actuatable occupant protection device in response to said signal of said switch element.

* * * * *